US009341235B2

(12) United States Patent
Beyer-Olsen

(10) Patent No.: US 9,341,235 B2
(45) Date of Patent: May 17, 2016

(54) ATTACHMENT FLANGE FOR BUOYS AND MARINE FENDERS

(71) Applicant: Polyform U.S., Ltd., Kent, WA (US)

(72) Inventor: Jan Beyer-Olsen, Kent, WA (US)

(73) Assignee: Polyform U.S., Ltd., Kent, WA (US)

( * ) Notice: Subject to any disclaimer, the term of this patent is extended or adjusted under 35 U.S.C. 154(b) by 0 days.

(21) Appl. No.: 14/167,467

(22) Filed: Jan. 29, 2014

(65) Prior Publication Data

US 2015/0211602 A1   Jul. 30, 2015

(51) Int. Cl.
*B63B 59/02* (2006.01)
*B63B 21/00* (2006.01)
*B63B 21/04* (2006.01)
*F16G 11/00* (2006.01)

(52) U.S. Cl.
CPC ............... *F16G 11/00* (2013.01); *B63B 59/02* (2013.01); *B63B 2059/025* (2013.01); *Y10T 16/05* (2015.01)

(58) Field of Classification Search
CPC ......... F16G 11/00; B63B 59/04; B63B 22/04; B63B 21/04; B65H 57/04; B65H 57/06; B65H 57/10; F16F 1/3732; F16H 2007/185
USPC ............. 114/219; 441/1, 3, 6, 21, 23, 30
See application file for complete search history.

(56) References Cited

U.S. PATENT DOCUMENTS

| | | | | |
|---|---|---|---|---|
| 297,627 A * | 4/1884 | Patton | | 160/126 |
| 646,091 A * | 3/1900 | Hammond | | 403/210 |
| 3,806,927 A * | 4/1974 | Lane, Jr. | | 342/7 |
| D297,627 S | 9/1988 | Patton | | |
| 5,299,962 A * | 4/1994 | Saulnier et al. | | 441/26 |
| 5,454,742 A * | 10/1995 | Robertson | | 441/20 |
| 8,065,971 B2 * | 11/2011 | Loisel, Jr. | | 114/219 |
| 2003/0200910 A1 * | 10/2003 | Corlett | | B63B 59/02 114/219 |
| 2008/0000409 A1 * | 1/2008 | Adams | | 114/219 |
| 2013/0148473 A1 * | 6/2013 | Olivier | | 367/177 |

OTHER PUBLICATIONS

Taylor Made Products. 2005 Product Catalog Personal Watercraft Buoys Oct. 25, 2004 (retrieved on May 17, 2015) Retrieved from the internet: http://web.archive.org/web20041025035831/http://www.boatcovers.cc/cgi-bin/catalog.pl?item_id=78.*
Taylor Made Products. '2005 Product Catalog Personal Watercraft Buoys' Oct. 25, 2004 [retrieved on ]. Retrieved from the internet: <URL: http://web.archive.org/web/20041025035831/http://www.boatcovers.cc/cgi-bin/catalog.pl?item_id=78>.

* cited by examiner

*Primary Examiner* — Anthony Wiest
(74) *Attorney, Agent, or Firm* — George C. Rondeau, Jr.; Davis Wright Tremaine LLP

(57) ABSTRACT

An attachment flange for buoys and marine fenders. The attachment flange includes an opening therethrough that includes a substantially continuously curved interior surface which engages a line to increase the surface contact area between the opening of the attachment flange and the line. The opening of the attachment flange further includes rounded edges which reduce the abrasion and localized stress applied to the line. The curved surface with the rounded edges enables the attachment flange to receive less concentrated forces applied thereto, which may extend the life of the attachment flange or may reduce the required reinforcement needed for a given application. The features disclosed herein also reduce the abrasion and concentration of force applied to the line coupled to the attachment flange which helps to prevent line wear and failure.

20 Claims, 14 Drawing Sheets

ATTACHMENT FLANGE FOR BUOYS AND MARINE FENDERS

BACKGROUND

Marine devices such as marine fenders and buoys serve many boating uses. For example, boats generally deploy marine fenders when tying up at docks, jetties or against other boats to protect the boats from damage. The marine fenders may be formed of plastic and in many cases are hollow to allow for some deformation when absorbing the energy of an impact. The fenders are often deployed by using a line attached to the fender and tying the line to an attachment member on the boat, and positioning the fender to hang at the outward side of the boat.

Similarly, a line may be attached to a buoy and tied to another object. Buoys are typically used for marking objects in the water, such as navigational hazards, crab pots, fishing nets, mooring anchors, and the like.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
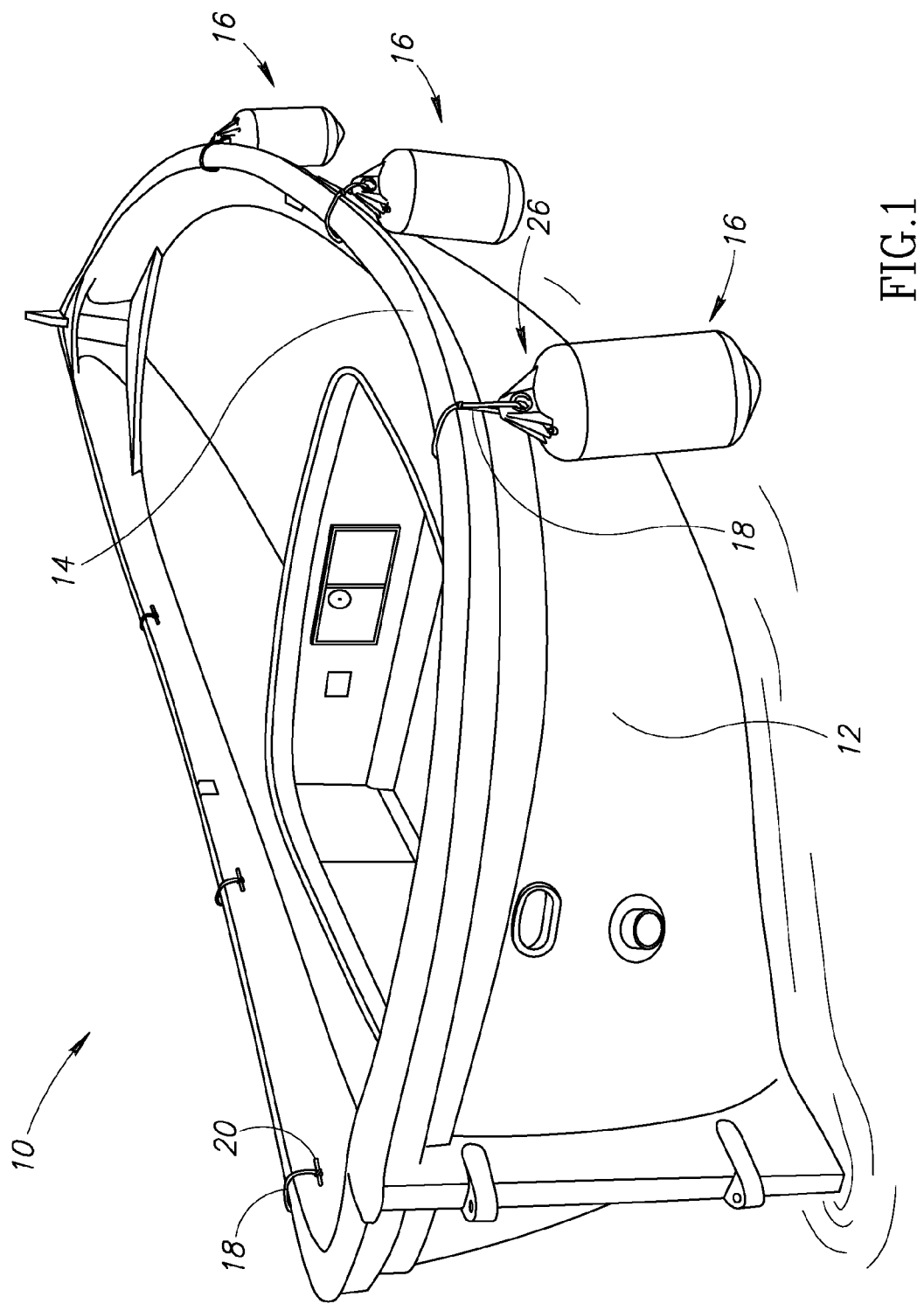
FIG. 1 illustrates a perspective view of a plurality of marine devices used as fenders in suspended positions against the outward side of a boat hull.

Referring to FIG. 1, a boat 10 is shown that includes a hull 12 on which a rail 14 is mounted. Several marine devices 16 are shown used as marine fenders or "bumpers" attached to attachment members of the boat 10, each via a line 18 tied to the marine device. The line 18 for each marine device 16 is tied to a cleat 20 fixedly attached to the boat 10 with the line extending over the rail 14 so as to suspend the marine device at a position below the rail at the outward side of the boat such that if the boat is urged against an object (e.g., a dock or another boat), all contact with that object is made through the fender. While the marine devices in FIG. 1 are illustrated at tied to cleats 20, the attachment members to which the lines 18 are tied may be other portions of the boat such as a rail. The lines 18 may in some situations be tied to other attachment members such as a dock.

Figure 2:
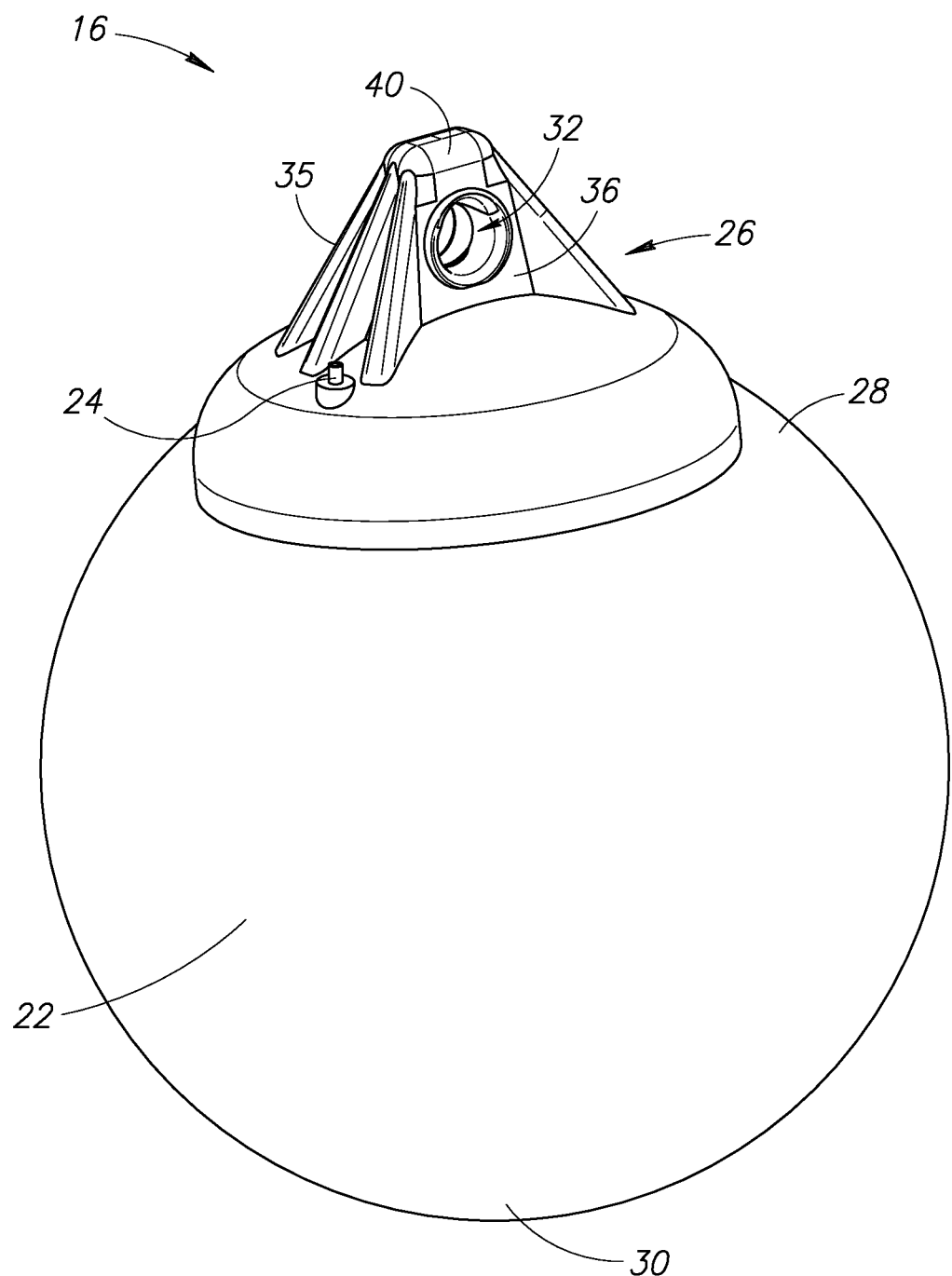
FIG. 2 illustrates a front left perspective view of a marine device according to an embodiment with a shape typically used as a buoy.
Figure 3:
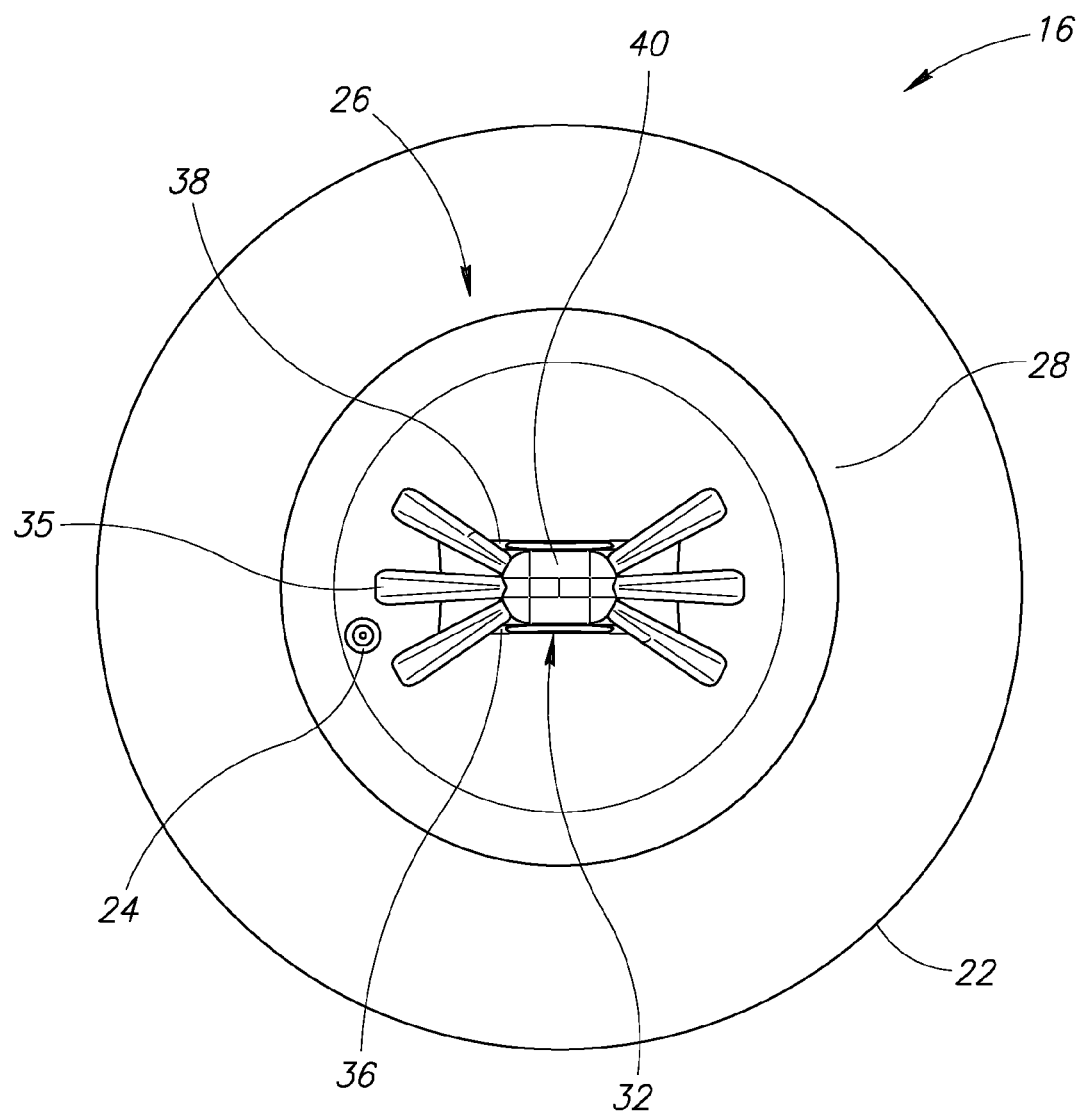
FIG. 3 illustrates a top view of the marine device shown in FIG. 2.
Figure 4:
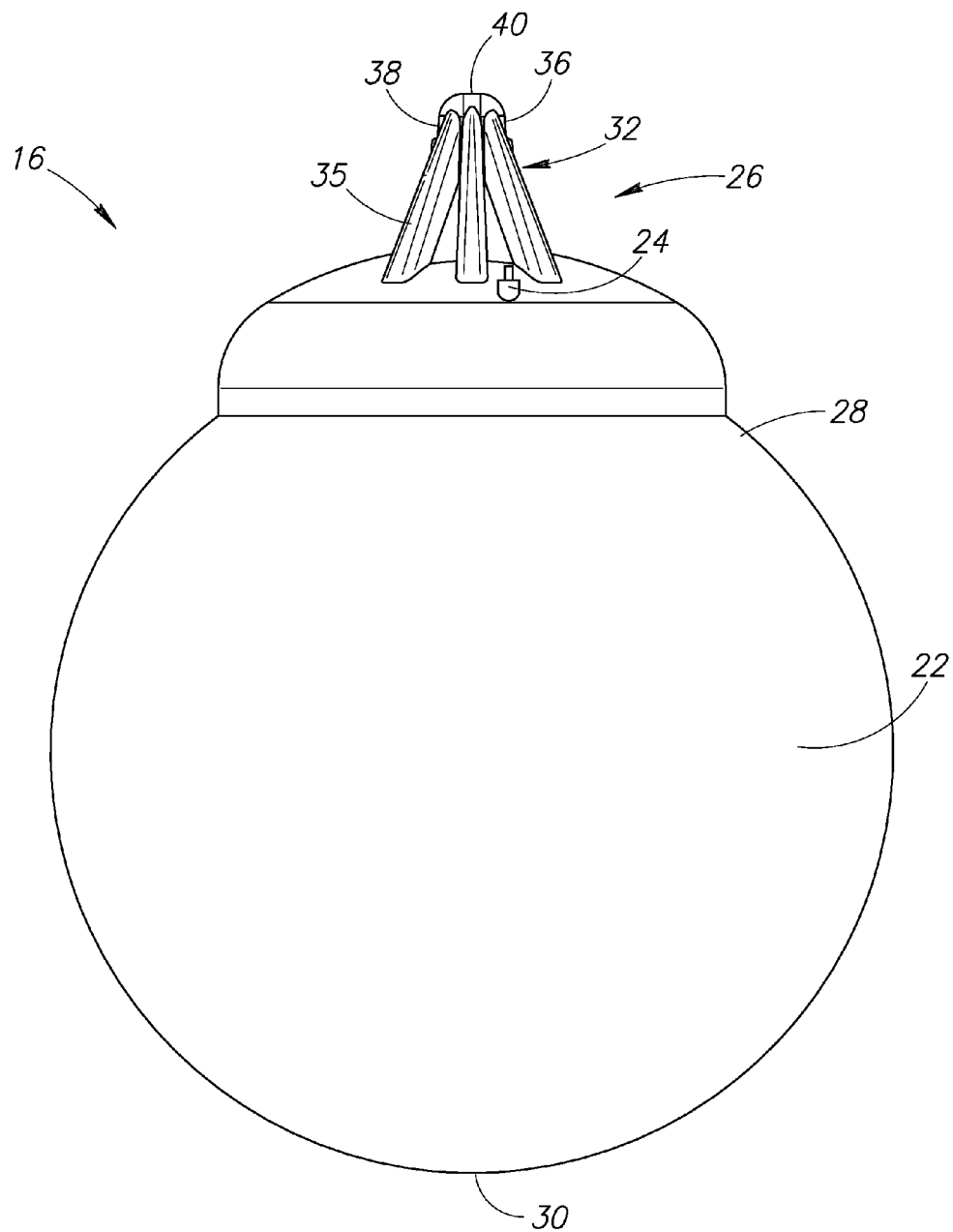
FIG. 4 illustrates a left side elevational view of the marine device of FIG. 2.

FIGS. 2-13 illustrates the marine device 16 having the body shape typically used for buoys. As shown in FIGS. 1 and 2, the marine device 16 includes a body portion 22 that may be hollow and inflatable via an inflation valve 24 (see FIG. 2). The marine device 16 also includes a flange portion 26 or "ropehold" integrally formed with the body portion 22, both being formed of a resilient material such as plastic. In some embodiments, the marine device 16 may be formed from ultraviolet resistant polyvinyl chloride (PVC). In some embodiments, the body portion 22 and the flange portion 26 may be formed from different materials and may be attached together using any suitable method. In the depicted embodiment, the body portion 22 is substantially globular (e.g., pear-shaped, teardrop shaped, spherical, etc.), but other shapes are contemplated (e.g., cylindrical, etc.). The body portion 22 of the marine device 16 has a first end 28 where the flange portion 26 is located and an opposite second end 30 which may or may not have another flange portion 26 attached when made for use as a marine fender. The marine devices 16 illustrated in the figures use a flange portion at only one end. When used as a marine fender, the first end 28 is typically positioned as shown in FIG. 1 with the first end being the upper end positioned above the second end 30. The marine device 16 will be described herein with respect to that orientation; however, a marine device used as a fender may also have an identical flange portion 26 at its second end 30 which allows lines ties to the two flange portions to be used to position the marine device horizontally. It should be appreciated that during use of the marine device 16 as a buoy tied to a submerged object such as a crab pot, the first end 28 of the body portion 22 will typically be located below the second end 30 and be submerged in the water.

Figure 5:
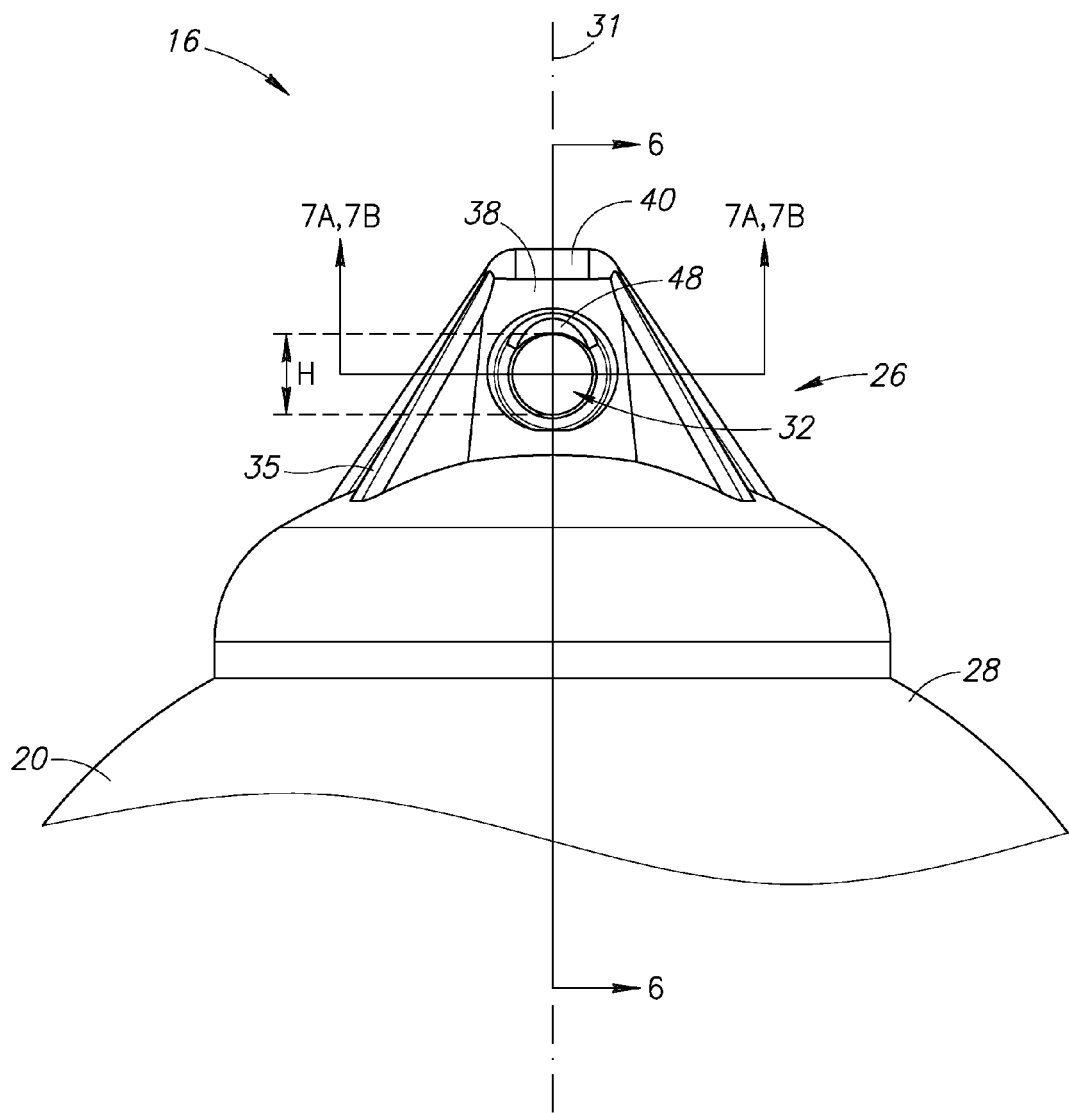
FIG. 5 illustrates a rear partial elevational view of the marine device of FIG. 2.

The flange portion 26 is provided at the first end 28 of the body portion 22 and extends upwardly therefrom (when used with the orientation shown in FIG. 2) along an axis of symmetry 31 of the body portion (see FIG. 5). An aperture or opening 32 is provided in the flange portion 26 that extends transversely through the thickness or depth (D) thereof (see FIG. 6) and serves as a line passageway. As shown best in FIGS. 2-4, the flange portion 26 may include a plurality of ribs 35 operative to provide structural reinforcement for the flange portion since the forces applied thereto may be relatively large when a line coupled thereto is taut and a force applied. As shown in FIGS. 8-11, the opening 32 has dimensions sufficient for a conventional line 18 with a diameter typically used with a marine fender or buoy having the particular size of the marine device boats. The line 18 passes through the opening and is used to accomplish attachment of the marine device 16 to a cleat, rail, crab pot or other object (e.g., the cleat 20 shown in FIG. 1).

Although the term "marine device" is used herein, it should be appreciated that the present disclosure applies to marine fenders and buoys for nets, long lines, lobster and crab pots, and marking or supporting other objects, and other uses. Additionally, the particular shape of the body portion 22 of the marine device 16 may be varied as needed.

Figure 6:
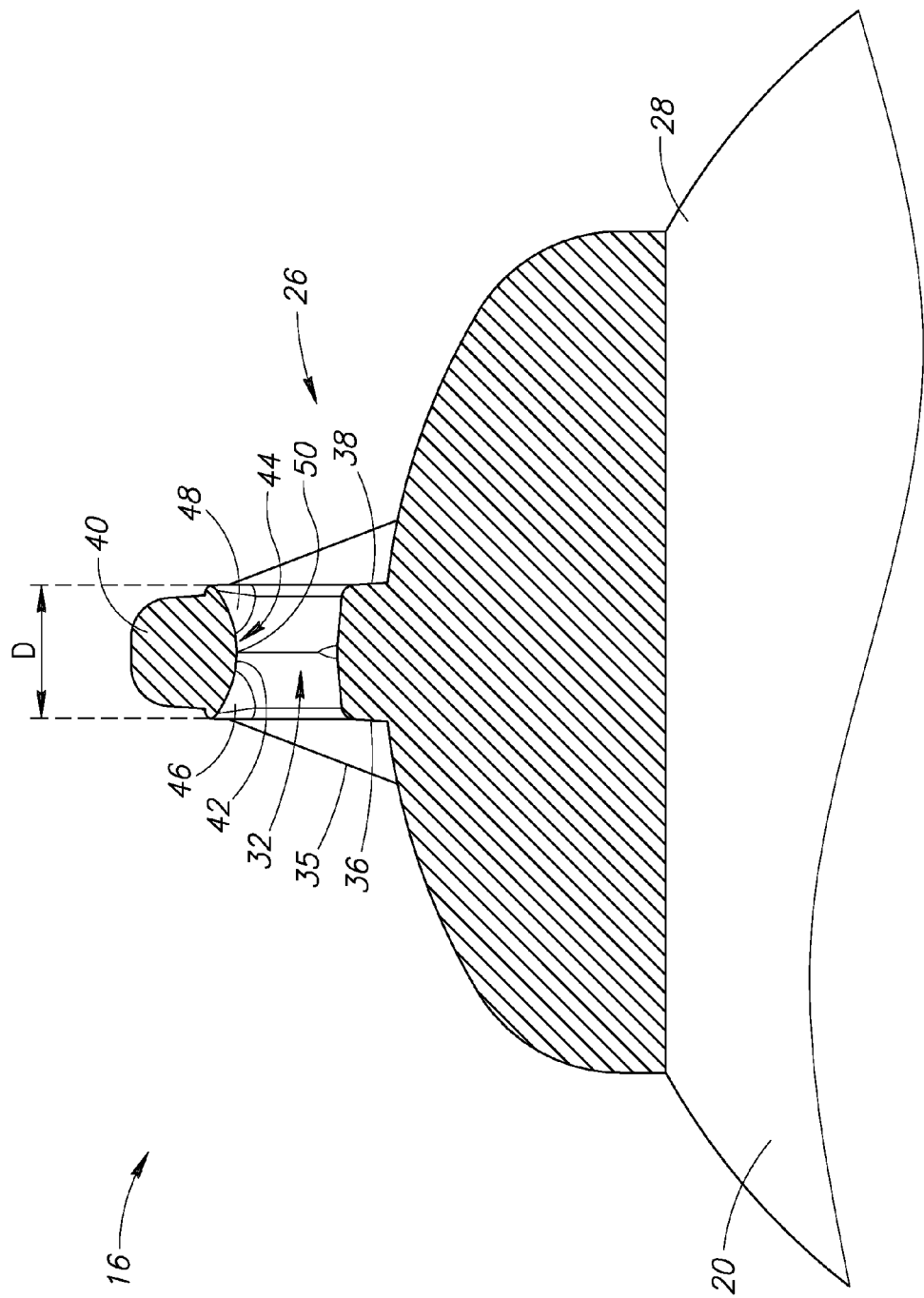
FIG. 6 illustrates a sectional view of the marine device taken substantially along the line 6-6 of FIG. 5.
Figure 7A:
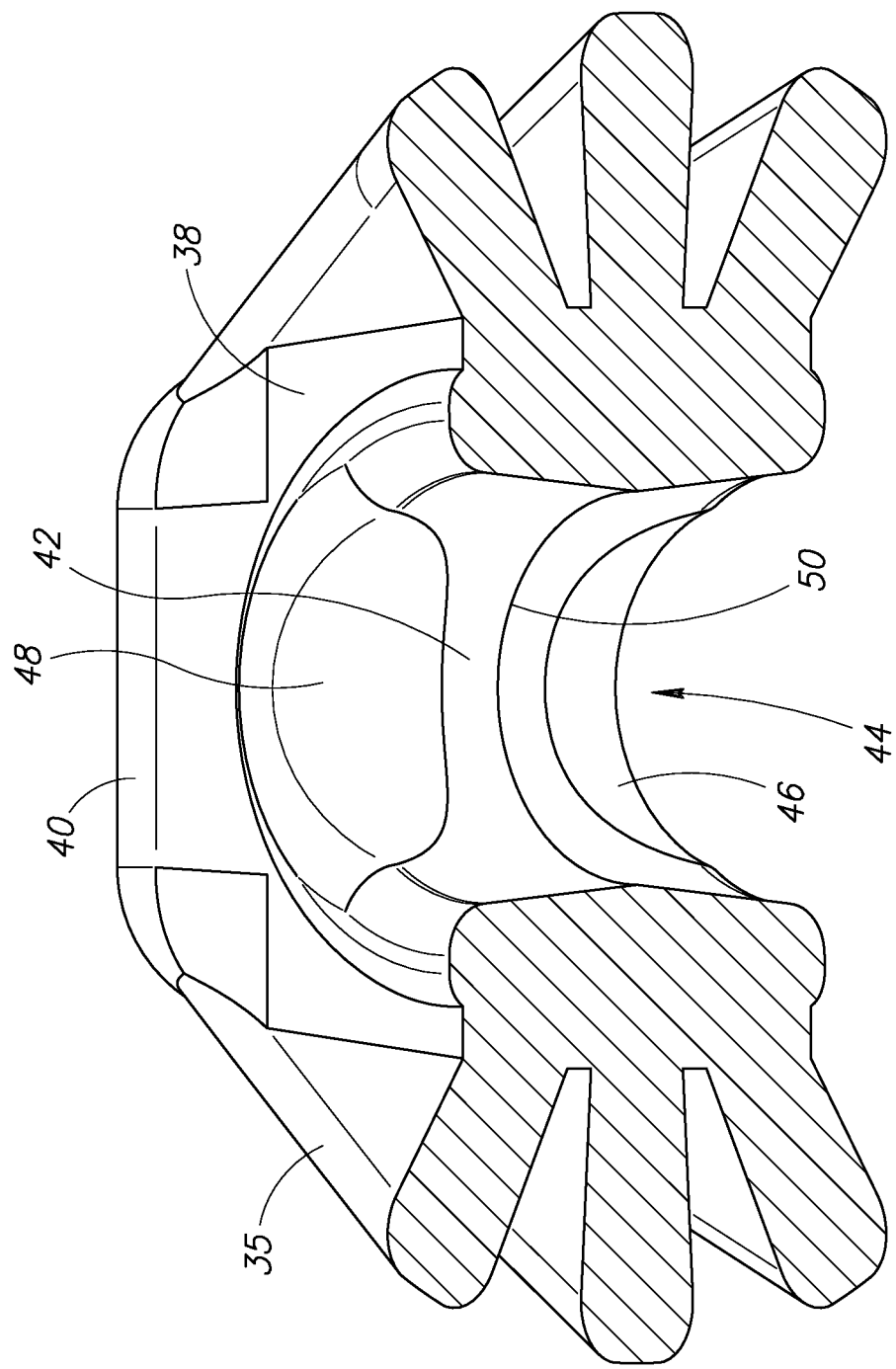
FIG. 7A illustrates a bottom perspective sectional view of a portion of an attachment flange of the marine device taken substantially along the line 7A,7B-7A,7B of FIG. 5.
Figure 7B:
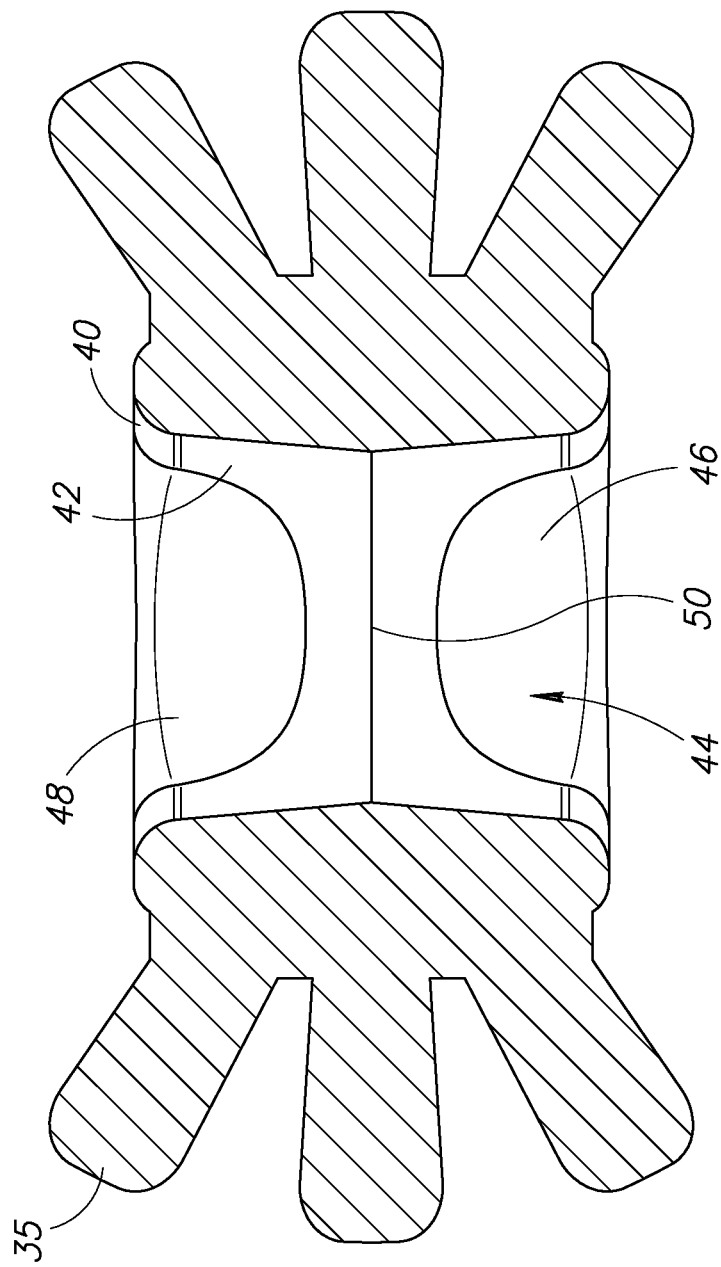
FIG. 7B illustrates a bottom sectional view of a portion of the attachment flange of the marine device taken substantially along the line 7A,7B-7A,7B of FIG. 5.
Figure 8:
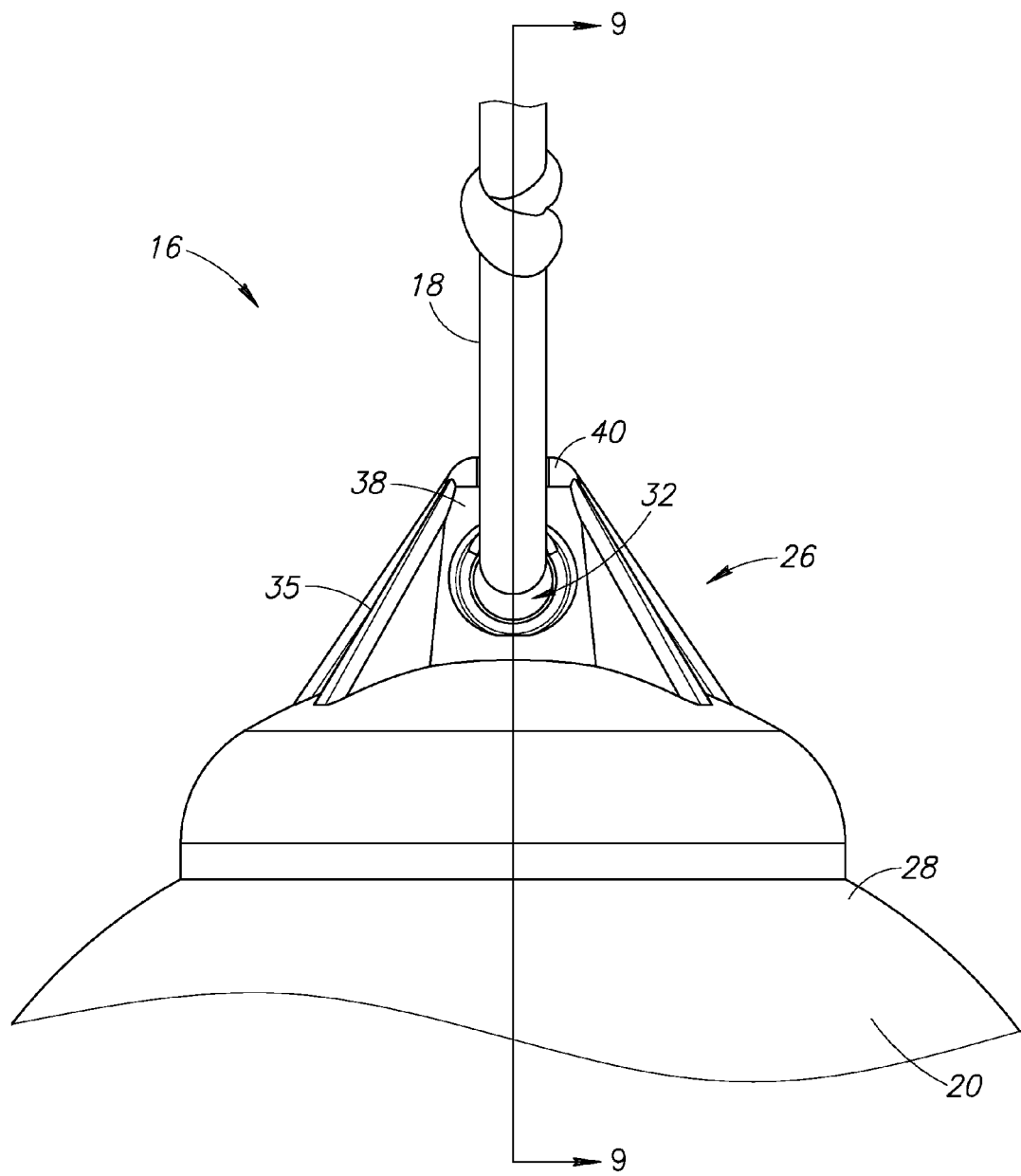
FIG. 8 illustrates a rear partial elevational view of the marine device with a line threaded through an opening thereof.

As shown best in FIGS. 5 and 6, the opening 32 is generally rounded in cross-sectional shape and has a minimum height (H) and the depth (D) that extends between a first side surface 36 of the flange portion 26 whereat there is a first side surface opening of the opening 32 and a spaced-apart second side surface 38 of the flange portion 26 whereat there is a second side surface opening of the opening 32. As shown best in FIGS. 6, 7A, and 7B, an end portion 40 of the flange portion 26 is located adjacent to the opening 32, on a side thereof axially outward of the body portion 22, and has an axially inward facing interior line engagement surface 42 defining the shape of an axially outward portion 44 of the opening 32 which contacts the line 18 when attached to the flange portion. With the orientation of the marine device 16 shown in FIGS. 5 AND 6, as well as in other figures, the interior line engagement surface 42 is facing downward and the axially outward portion 44 of the opening 32 forms an upper portion of the opening. The axially outward portion 44 of the opening 32 includes a first recess or relief 46 extending from the first side surface 36 of the end portion 40 of the flange portion 26 toward the interior of the opening. The axially outward portion 44 of the opening 32 also include a second recess or relief 48 extending from the second side surface 38 of the end portion 40 of the flange portion 26 toward the interior of the opening. As shown in FIGS. 5 and 6 where the marine device 16 has an orientation typical for a marine fender when suspended from the line 18 for use, the first end 28 of the body portion 22 is located above the second body end 30, thus the interior line engagement surface 42 is downward facing and described as such herein, however, when used as a buoy with the first end 28 of the body portion 22 below the second end 30, the interior line engagement surface 42 would be upwardly facing. In both orientations, the interior line engagement surface 42 is the surface the line 18 engages and transmits to the flange portion 26 the force applied by the line when the marine device 16 is in use.

Figure 9:
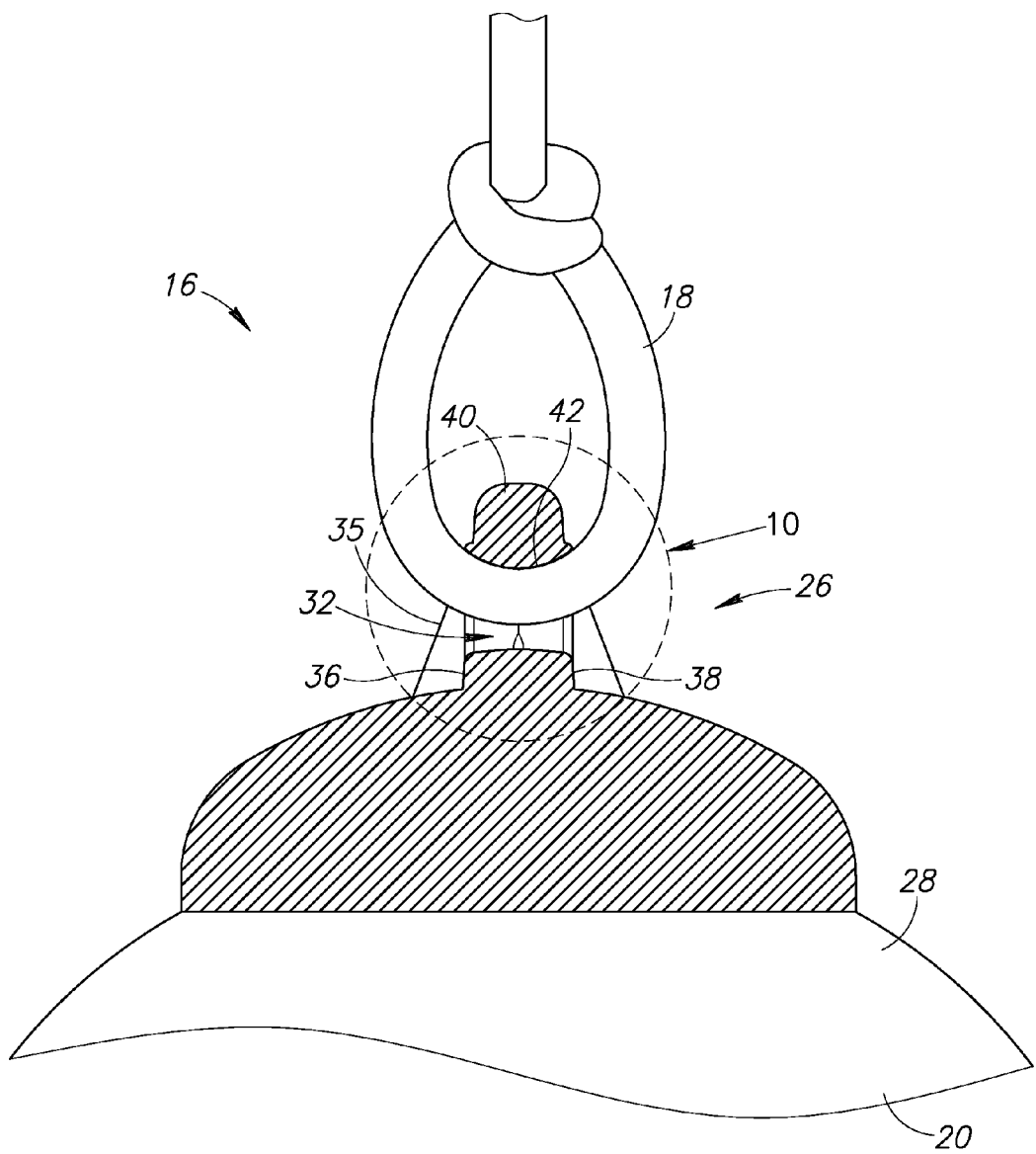
FIG. 9 illustrates a sectional view of the marine device taken substantially along the line 9-9 of FIG. 8.
Figure 10:
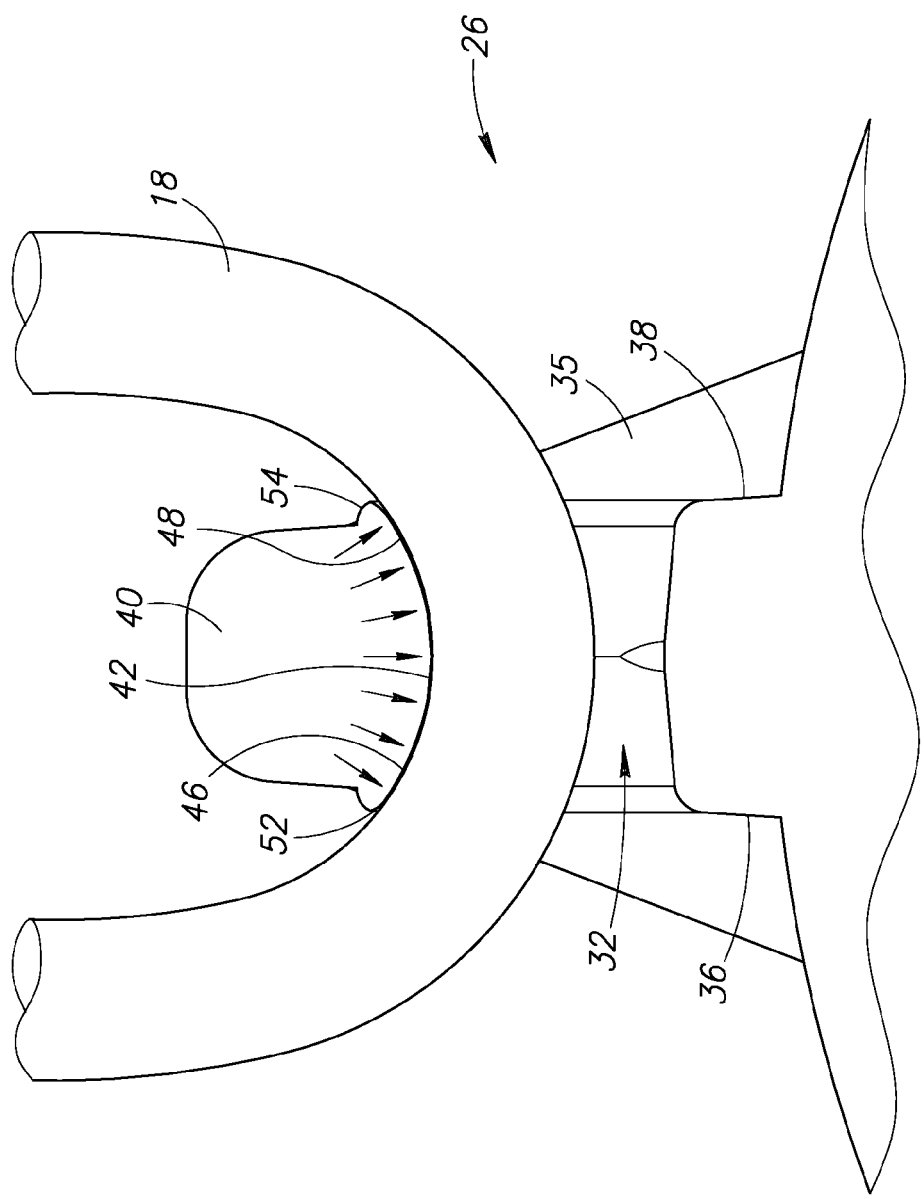
FIG. 10 illustrates an enlarged view of a portion of FIG. 9 that illustrates the contact between a line and the attachment flange.

As used herein, the first relief 46, second relief 48, and an axially inward facing central portion 50 (downward facing in FIGS. 5 and 6, and others) of the end portion 40 of the flange portion 26 together form the interior line engagement surface 42 of the opening 32. As shown in FIGS. 9 and 10, the interior line engagement surface 42 of the opening 32 provides a substantially continuously and gradual curved surface, curving along its length away from the body portion 22, and against which the line 18 bears and which transmits force between the flange portion 26 and the line 18, thus eliminating any sharp edges, which would tend to damage or cut into the line 18 or possibly over stress the line when it is put under tension. As illustrated by the numerous small arrows in FIG. 10, the forces acting on the line 18 and the flange portion 26 are distributed substantially evenly along the length of the interior line engagement surface 42 of the opening 32. Additionally, outermost portions 52 and 54 (see FIG. 10) of the first and second reliefs 46 and 48, respectively, are flared or rounded off to reduce sharp corners that would tend to increase line abrasion and reduce the area of the flange portion 26 that the line 18 contacts, which would have the effect of increasing the concentration of forces on portions of the line and the flange portion.

Figure 11:
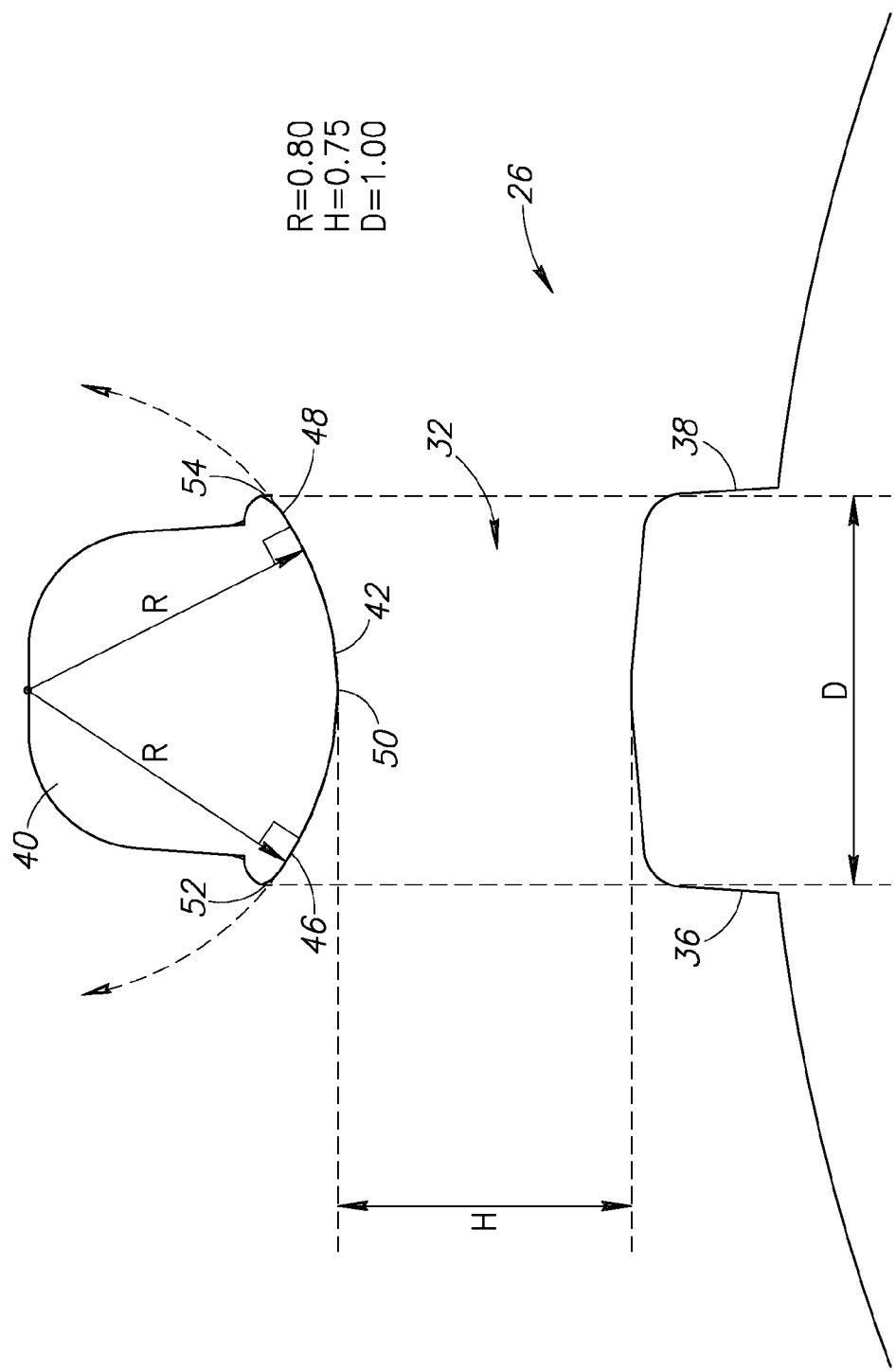
FIG. 11 is a schematic view of the attachment flange illustrating various physical dimensions thereof.

FIG. 11 illustrates a radius of curvature (R) of the interior line engagement surface 42 of the opening 32 relative to the minimum height (H) and relative to the depth (D) of the opening. The sizing of these dimensions may vary with the size of the marine device 16 and its load rating. The sizing may also vary dependent on the diameter and stiffness of the line 18 intended for use with the marine device 16. For example, a relatively stiff line 18 that does not bend as easily may require the interior line engagement surface 42 of the opening 32 have less curvature so that a substantial length of the line 18 is in contact with the contact surface when a force is applied to the line.

Figure 12:
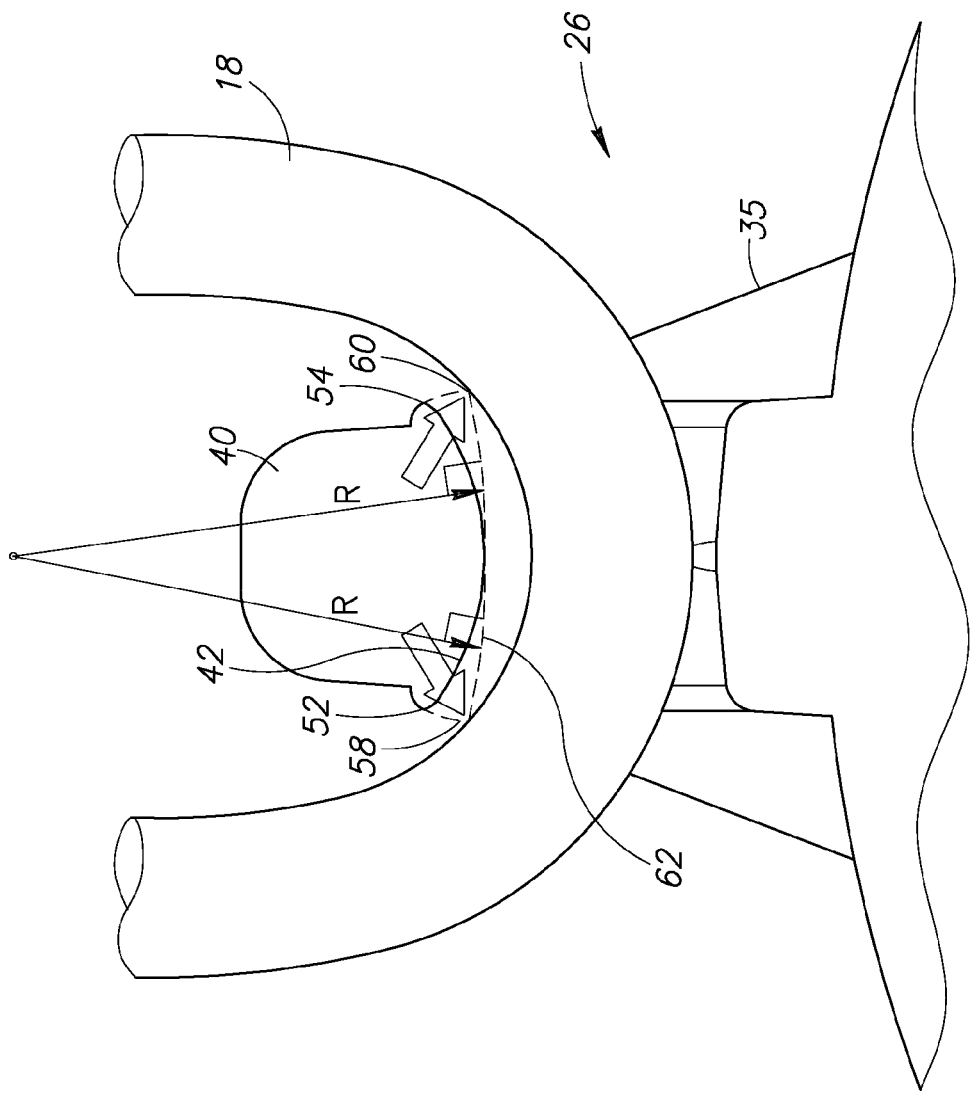
FIG. 12 is a sectional view of the attachment flange of the marine device illustrating in dashed lines the contact between a line and the attachment flange when the line is threaded through the opening in an instance where relief portions of the attachment flange are not provided.

FIG. 12 illustrates two edges 58 and 60 (shown in dashed lines) that would be present without the reliefs 46 and 48. In this example, the curvature of a line contact surface 62 would be very small (i.e., a large radius of curvature R). As indicated by the two large arrows, relatively large forces would act on the line 18 and the flange portion 26 at the two edges 58 and 60 since the forces would be concentrated at the edges, rather than being spread more evenly along the substantially continuously curved downward facing upper surface as shown in FIG. 10. These concentrated forces at the edges 58 and 60 would tend to increase abrasion and localized stress on the line 18 and may lead to fraying and/or failure of the line.

Figure 13:
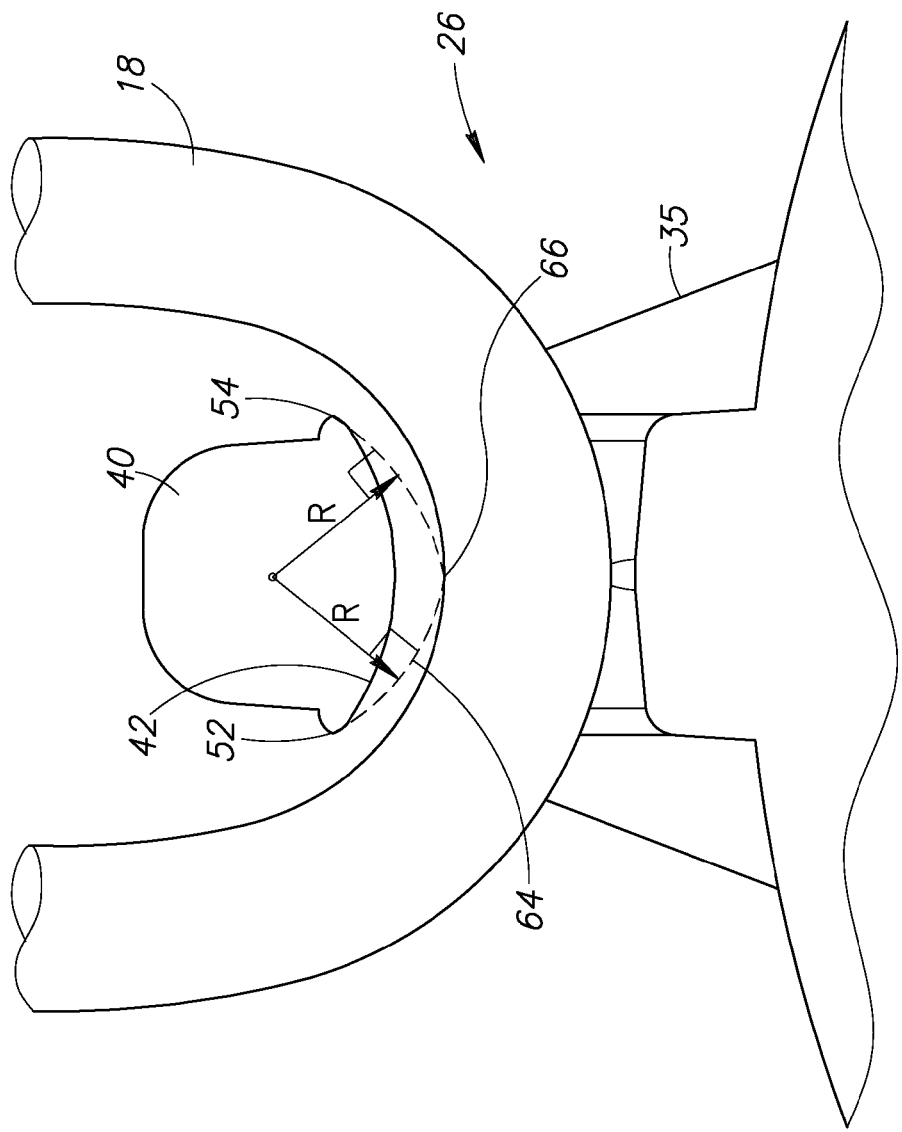
FIG. 13 is a sectional view of the attachment flange of the marine device illustrating in dashed lines the contact between a line and the attachment flange when the line is threaded through the opening in an instance where an upper surface of the opening of the attachment flange has a relatively large curvature that that would increase line abrasion by reducing the line contact surface area of the attachment flange.

Conversely, FIG. 13 illustrates a contact surface 64 (in dashed lines) that has a relatively large curvature (small radius of curvature R). In this instance, due to the thickness and/or stiffness of the line 18, the line would contact the flange portion 26 at the relatively small contact surface edge 66 when a force is applied to the line. The smaller contact surface edge 66 would cause an undesirable increase in abrasion and localized stress for the line 18 and an increase in forces on the flange portion 26.

It has been found that for most applications the radius of curvature (R) of the interior line engagement surface 42 of the opening 32 should be approximately 50% to 100% of the depth (D) of the opening. At these values the line 18 contacts the interior line engagement surface 42 along substantially the entire depth (D) of the opening 32, which maximizes the distribution of the force applied between the line 18 and the flange portion 26, and reduces abrasion and localized stresses on the line.

A preferred curvature for the interior line engagement surface 42 can be calculate using an elliptical arc shape for the surface. In particular, the curvature for the interior line engagement surface 42 can be calculated using the axis of symmetry 31 as the major axis of an ellipse with the center of the ellipse selected at a desired point located along the axis of symmetry 31 at a location above the end portion 40 of the attachment flange 26, with the minor axis extending transverse thereto and to the axis of the opening 32, to define a vertical ellipse. The curvature will be defined using the formula $x^2/b^2 + y^2/a^2 = 1$, with "a²" being greater than "b²", where "a"=the length of the semi-major axis (along the "y" axis extending along the axis of symmetry 31), and "b"=the length of the semi-minor axis (along the "x" axis transverse to the axis of symmetry). While a vertical ellipse to determine the curvature of the interior line engagement surface 42, a horizontal ellipse shape may be used with the minor axis of an ellipse extending along the axis of symmetry 31 and the major axis extending transverse thereto and to the axis of the opening 32 (where using the above formula "$b^2$" is greater than "$a^2$"). Alternatively, the above formula may be used with "$a^2$" being equal to "$b^2$" which describes a circle with the curvature for the interior line engagement surface 42 being a circular arc.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A marine buoy or fender, comprising:
a flexible body; and
a flange attached to the flexible body and extending outwardly therefrom, the flange including a first side surface and an opposing second side surface, the first side surface having a first side surface opening and the second side surface having a second side surface opening, the flange further including a line passageway extending between the first side surface opening and the second side surface opening and sized to receive a line therethrough, the line passageway having a depth extending between the first side surface opening and the second side surface opening and an interior line engagement upper surface having a substantially elliptical segment shape extending between the first side surface opening and the second side surface opening, the elliptical segment shape having a major axis perpendicular to a minor axis, the major axis having a greater length than the minor axis.

2. The marine buoy or fender of claim 1, wherein the flexible body comprises an inflatable enclosure.

3. The marine buoy or fender of claim 1, wherein the flange and the flexible body are integrally formed.

4. The marine buoy or fender of claim 1, wherein the interior line engagement upper surface has a radius of curvature that is between 50% and 100% of the depth of the line passageway.

5. The marine buoy or fender of claim 1, wherein the interior line engagement upper surface has a radius of curvature that is between 75% and 85% of the depth of the line passageway.

6. The marine buoy or fender of claim 1, the flange having an upper portion with a first width extending between an upper portion first side surface and an upper portion second side surface, the first width being less than the depth of the line passageway, the flange including a first relief lip protruding from the upper portion first side surface and having a first rounded outer edge portion at the first side surface opening, and a second relief lip protruding from the upper portion second side surface and having a second rounded outer edge portion at the second side surface opening.

7. The marine buoy or fender of claim 6, wherein lower surface portions of the first relief lip and the second relief lip respectively define, at the first side surface opening and the second side surface opening, the substantially elliptical segment shape of the interior line engagement upper surface.

8. The marine buoy or fender of claim 6, the flange having a lower portion with a second width extending between a lower portion first side surface and a lower portion second side surface, the second width being equal to or greater than the depth of the line passageway.

9. A marine buoy or fender, comprising:
a flexible body having an axis of symmetry; and
an attachment flange attached to the flexible body and extending outwardly therefrom along the axis of symmetry, the attachment flange including a first side surface and an opposing second side surface, the first side surface having a first side surface opening and the second side surface having a second side surface opening, the attachment flange further including a line passageway extending between the first side surface opening and the second side surface opening and sized to receive a line therethrough, the line passageway having a line engagement upper surface located between the first side surface opening and the second side surface opening with a curvature comprising a substantially elliptical segment shape having a major axis and a minor axis perpendicular to the major axis, the major axis having a different length than the minor axis.

10. The marine buoy or fender of claim 9, wherein the elliptical segment shape curvature of the line engagement upper surface has the shape of a vertical ellipse with the major axis of the ellipse extending along the axis of symmetry with a center of the ellipse selected at a point located along the axis of symmetry at a location axially outward of the an axially outward end of the attachment flange.

11. The marine buoy or fender of claim 9, wherein the elliptical segment shape curvature of the line engagement upper surface has the shape of a horizontal ellipse with the minor axis of the ellipse extending along the axis of symmetry with a center of the ellipse selected at a point located along the axis of symmetry at a location axially outward of the an axially outward end of the attachment flange, and a major axis of the ellipse extending transverse to the axis of symmetry.

12. The marine buoy or fender of claim 9, wherein the attachment flange has an upper portion farther away along the axis of symmetry than a lower portion attached to the body portion, the upper portion having a first width extending between an upper portion first side surface and an upper portion second side surface, the first width being less than a depth of the line passageway extending between the first side surface opening and the second side surface opening, the flange including a first relief lip protruding from the upper portion first side surface and having a first rounded outer edge portion at the first side surface opening, and a second relief lip protruding from the upper portion second side surface and having a second rounded outer edge portion at the second side surface opening.

13. The marine buoy or fender of claim 12, wherein lower surface portions of the first relief lip and the second relief lip respectively define, at the first side surface opening and the second side surface opening, the substantially elliptical segment shape of the interior line engagement upper surface.

14. The marine buoy or fender of claim 12, the lower portion of the attachment flange having a second width extending between a lower portion first side surface and a lower portion second side surface, the second width being equal to or greater than the depth of the line passageway.

15. A marine buoy or fender, comprising:
a body portion having an axis of symmetry; and
a flange portion integrally formed with the body portion and extending outwardly therefrom along the axis of symmetry, the flange portion including a first side surface and an opposing second side surface, the first side surface having a first side surface opening and the second side surface having a second side surface opening, the flange portion further including a line passageway extending between the first side surface opening and the second side surface opening and sized to receive a line therethrough, the line passageway having a line engagement upper surface located between the first side surface opening and the second side surface opening, the line engagement upper surface having a middle portion, a first surface portion and a second surface portion, the first surface portion extending from the middle portion and curving outwardly toward the first side surface opening and away from the body portion and the second surface portion extending from the middle portion and curving outwardly toward the second side surface opening and away from the body portion to define a substantially elliptical segment shape extending between the first side surface opening and the second side surface opening and curving away from the body portion, the substantially elliptical segment shape having a major axis and a minor axis perpendicular to the major axis, the major axis having a different length than the minor axis.

16. The marine buoy or fender of claim 15, wherein the line passageway has a depth extending between the first side surface opening and the second side surface opening, and the line engagement upper surface has a radius of curvature that is between 50% and 100% of the depth of the line passageway.

17. The marine buoy or fender of claim 15, wherein the line passageway has a depth extending between the first side surface opening and the second side surface opening, and the line engagement upper surface has a radius of curvature that is between 75% and 85% of the depth of the line passageway.

18. The marine buoy or fender of claim 15, the flange portion having an upper portion with a first width extending between an upper portion first side surface and an upper portion second side surface, the first width being less than a depth of the line passageway extending between the first side surface opening and the second side surface opening, the flange portion including a first relief lip projecting laterally from the upper first side surface and curving downwardly and toward the first side surface opening, and a second relief lip projecting laterally from the upper second side surface and curving downwardly and toward the second side surface opening.

19. The marine buoy or fender of claim 18, wherein lower surface portions of the first relief lip and the second relief lip respectively define, at the first side surface opening and the second side surface opening, the substantially elliptical segment shape of the interior line engagement upper surface, the first relief lip having a first rounded outer edge portion at the first side surface opening, and the second relief lip having a second rounded outer edge portion at the second side surface opening.

20. The marine buoy or fender of claim 19, the lower portion of the flange portion having a second width extending between a lower portion first side surface and a lower portion second side surface, the second width being equal to or greater than the depth of the line passageway.

* * * * *